Figure 1:
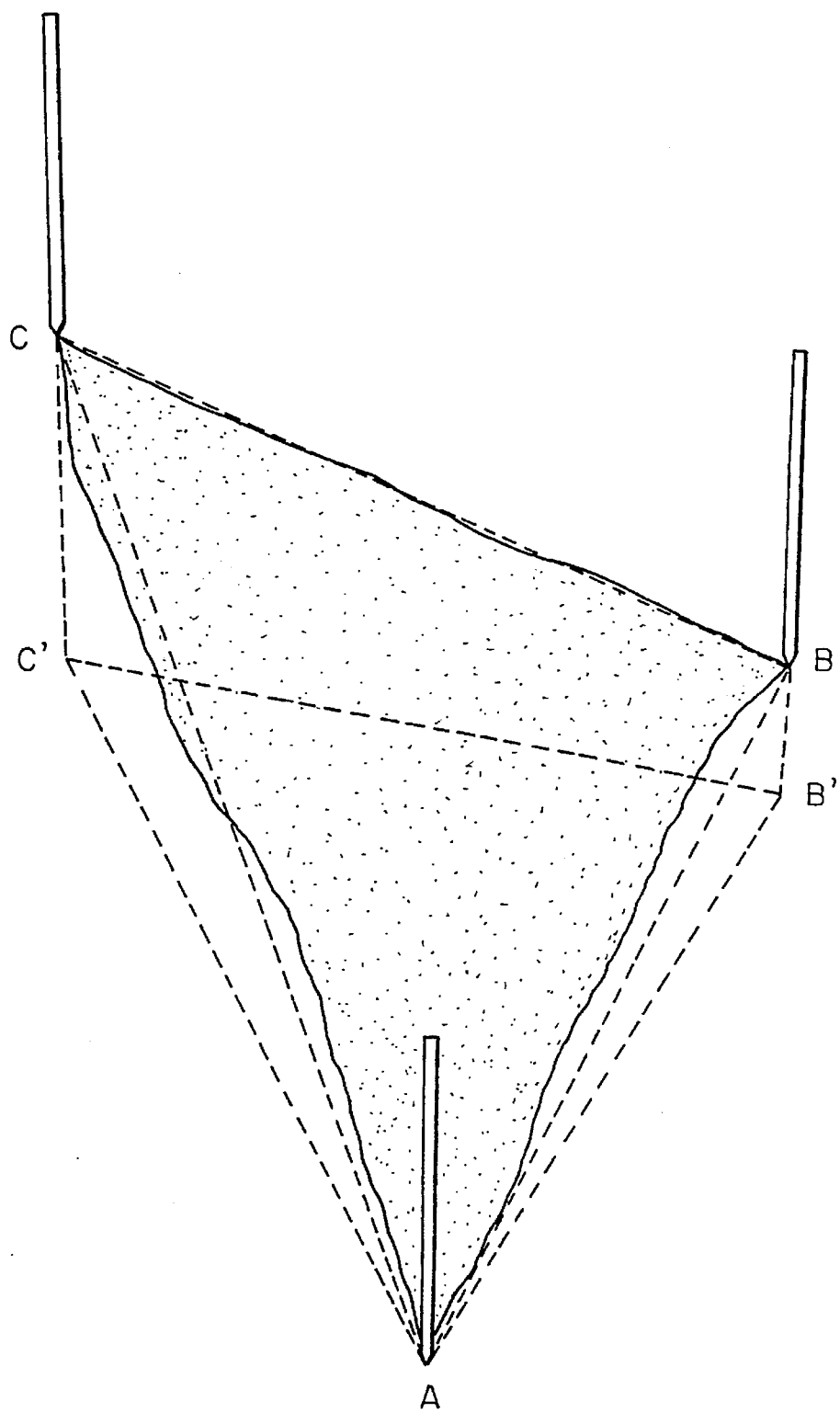

United States Patent [19]
Vuch et al.

[11] Patent Number: 5,491,485
[45] Date of Patent: Feb. 13, 1996

[54] SURVEYING SYSTEM USING RADIO RANGING AND BAROMETRIC HEIGHT

[76] Inventors: Walter Vuch, Loc. S. Barbara 73/B; Mario Mattera, Calle de Bernardis 16, both of 34015 Muggia (TS), Italy

[21] Appl. No.: 232,265
[22] PCT Filed: Oct. 30, 1992
[86] PCT No.: PCT/IT92/00133
  § 371 Date: May 6, 1994
  § 102(e) Date: May 6, 1994
[87] PCT Pub. No.: WO93/09399
  PCT Pub. Date: May 13, 1993

[30] Foreign Application Priority Data

Nov. 7, 1991 [IT] Italy ............... TS91A0011

[51] Int. Cl.⁶ ............... G01C 15/00; G01C 5/06
[52] U.S. Cl. ............... 342/191
[58] Field of Search ............... 342/191, 126

[56] References Cited

U.S. PATENT DOCUMENTS

| | | | |
|---|---|---|---|
| 3,936,797 | 2/1976 | Andresen, Jr. | 342/120 |
| 4,050,067 | 9/1977 | Elmore, Jr. | 342/191 |
| 4,295,201 | 10/1981 | Wiklund | 356/3 |
| 4,413,907 | 11/1983 | Lane | 356/5 |
| 4,495,500 | 1/1985 | Vickers | 342/191 |

FOREIGN PATENT DOCUMENTS 0051913  5/1982  European Pat. Off.

OTHER PUBLICATIONS

Soviet Inventions Illustrated. Section ET, Week D48, Jan. 13, 1982. (Derwent Publications Ltd., London, Great Britain). Class S, AN B1–M3077. (abstract).

Patent Abstracts Of Japan, vol. 6, No. 248 (p–160)(1126) Dec. 7, 1982. (abstract).

*Primary Examiner*—Daniel T. Pihulic
*Attorney, Agent, or Firm*—Browdy and Neimark

[57] ABSTRACT

Electromagnetic waves and barometric sensors system for the measurement of distances and heights. The system at issue is of great use in the field of topographical, cadastral and any other kind of ground survey, including the measurement and mapping of interiors.

Such system allows the measurement both of distances between points and of their heights, even when the points to be surveyed are not visible from the survey stations. It employs at least two portable stationary units (9) and one portable mobile unit (1).

The above-mentioned units are built as rods, each made of a tube (12) of watertight and insulating material provided with both a lower pointed end (13) and a spheric level (2). The accumulators (6), the transceiver instruments (4), the aerial (15), the barometric sensor (3), together with the electronic components (5) or (10) are housed inside each rod. As far as the electronic components are concerned, they are differently structured according to the portable unit they are in, be it the first stationary unit (9), the second stationary unit (9) or the mobile unit (1).

Each portable mobile unit (1) also includes a portable control keyboard (8).

3 Claims, 4 Drawing Sheets

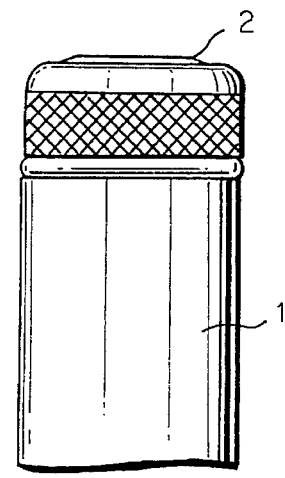
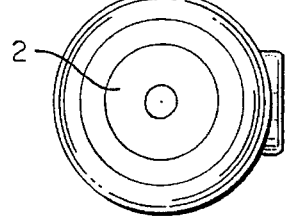
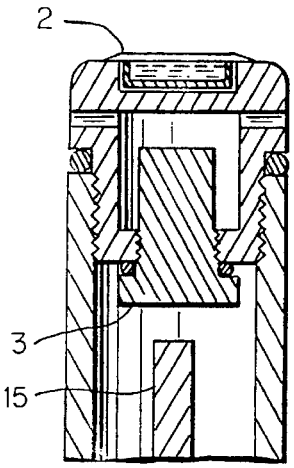
FIG. 2　　FIG. 5
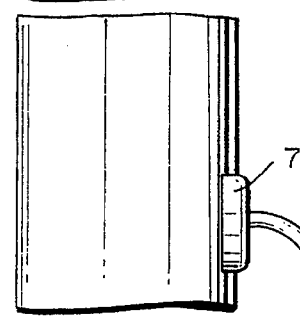
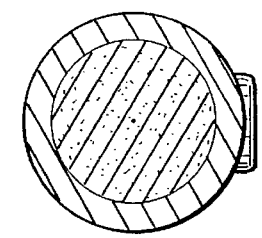
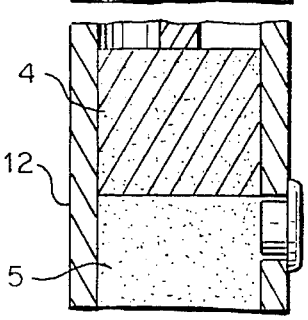
FIG. 3
FIG. 4
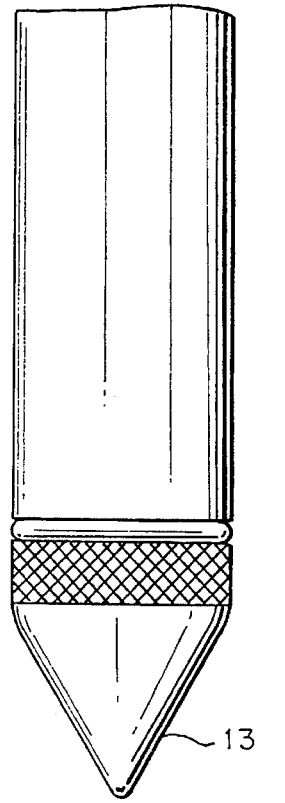
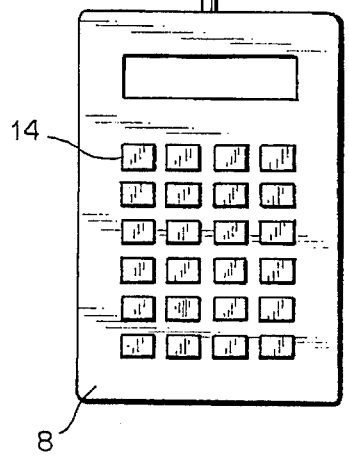
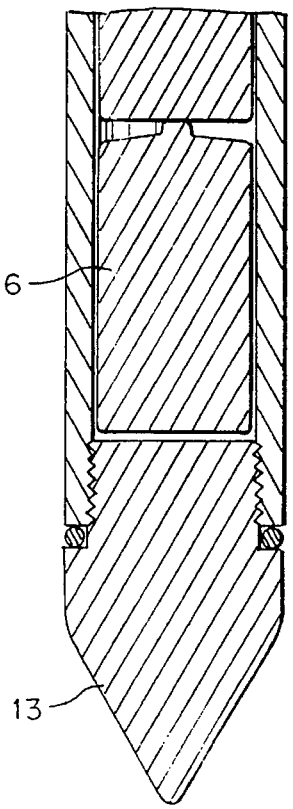
FIG. 6

SURVEYING SYSTEM USING RADIO RANGING AND BAROMETRIC HEIGHT

The system at issue has been studied to be of great use in the field of topographical, cadastral and any other kind of ground surveys, including the measurement and the mapping of interiors.

By means of electromagnetic waves and barometric sensors, the above-mentioned system allows the measurement both of distances between points and of their heights, even when the points to be surveyed are not visible from the survey stations.

Most of the systems employed in this field use high precision optical and mechanical-optical instruments. The application of electronics in this field is relatively recent and it integrates traditional optical devices such as tacheometers, theodolites etc. This is due both to the increased potentiality of the instruments and to the: reduction of the risk of errors. Electronic devices allow more accurate measurements, they save time in the processing of the data, while their accessories are lighter, less bulky and easy to carry. All these advantages obviously influence the price, which is sensibly higher than that of the traditional instruments.

Data registers that, once connected to an electronic unit, can automatically record all the surveyed data descriptions of the targets surveyed and additional notes of various kind, have been recently put on the market. When connected to a computer, such registers transfer the surveyed data to it, producing tabulations and/or graphics with no need of the operator's presence. This completely prevents any possibility of mistake both in the transcriptions and in the conversion computation of the surveyed data.

Since all the instruments currently employed, both traditional and electronic, are basically optical, they all need the points to survey to be visible to the operator working on the instrumental unit. The European Patent n. A-0 051 913 filed on Aug. 14th 1981 must be mentioned in connection with this. This Patent describes a method and an apparatus for remote control surveying of distances, the method comprises the steps of positioning electronic distance measuring and rotating reflector units in spaced relation, of energizing the reflector unit from adjacent the measuring device in order to create a sight line between the devices, ad of measuring the distance-between the devices-with the electronic distance measuring device.

The surveying apparatus comprises a reflector unit, a motor for rotating said unit, a radio receiver energizing said motor and a portable radio transmitter controlling said receiver.

Both the presence of reflector units and the repeated statement that the devices must be reciprocally visible to each other in order to create a sight line indicate that such a method of surveying distances is based on the employment of electromagnetic waves whose wavelength ranges between 300μ and 100 Å—namely light waves—as vectors. In case of poor visibility, when the vegetation is thick, or in the middle of conurbation, the devices described in this Patent and the optical instruments used nowadays in general are often unusable if not supplemented by survey methods alternative to direct measurement such as, for instance, by referring to a traverse measured at a series of instrument stations from which the points to survey are visible.

While such devices are generally effective and ingenious, they require the use of heavy and complex equipments due to the presence of accumulators, of strong and sturdy tripods, of reflector units, of motors, of radio receiver, etc. A bigger problem is then represented by the necessity of positioning the devices over reciprocally visible points and on an even plane, since the devices can only rotate on an horizontal plane; it is therefore impossible to collimate points located outside such a plane.

The SU Patent A-802 783 must be mentioned as far as the use of barometers is concerned. This Patent describes an altitude measuring system which has two fixed and one movable barometers and includes one unit to determine the difference between information from pressure converters. The signals from the two atmosphere converters pass to two radio transmitters and then to two radio receivers, the radio receivers pass them to two units which fix both the difference between the signals and the value of the difference in pressure between one of the fixed stations and the movable station. The transmission of information among the various stations thus occurs by means of radio waves. The radio waves are however used only for the data transmission.

The invention at issue, a system to measure distances and heights of any kind, is based on radio ranging electromagnetic waves and barometric sensors. Its purpose is to help the measurement of both distances and heights of points even when the latter are not visible, thus allowing any kind ground survey (be it topographical, cadastral, of either buildings or roads) also in poor visibility. Another purpose of the above-mentioned device is to make very easy the measurement work needed in a ground survey. The device shortens the time needed for measurements, reduces the minimum number of operators from two to one while increasing the accuracy of the measurements; finally, it is equipped with light and handy accessories. Its additional advantage is to be produced at a rather interesting cost.

The device at issue basically consists of two portable stationary units and one portable mobile unit. This is the lowest possible number of elements needed to survey through trilateration.

By increasing the number of the portable stationary units it is possible to survey a wider number of measures in order to determine the sides of a triangle for a possible verification. On the other hand, by setting out a grid of permanent stationary units on a chosen area, surveys with a common system of orientation can be carried out by numberless operators. By increasing the number of the portable mobile units it is in fact possible to perform a survey employing several operators at the same time, thus reducing the total length or time required by the measurements themselves.

The above-mentioned portable units can for instance be built—this, however, is not binding—as rods of insulating material (for instance, three rods about one meter long and about 3,5 centimeters wide). While their lower ends are pointed, on the upper ends—under a spherical level—is the housing for the barometric sensor.

The feeding elements of the electronic system, the electronic circuits, the transceiver, the aerial and the barometric sensor, together with the spherical level are to be found inside each rod.

Such units are very easy to carry even on rough terrains and it is possible to plumb set them up quickly by means of, for instance, tripods with ball-point pliers (already commonly used to support stadia rods and reflecting prism stands).

It is important to underline that this device does not employ optical, mechanical-optical, mechanical-electronic elements nor precision instruments, which are on the contrary present both in the traditional and in the electronic-optical instruments. Finally, it has to be underlined the good resistance of such a device to collisions and accidental drop impacts.

The whole system contained in the rods has a watertight protection against rain and even against immersion, the only exception being the housing of the barometric sensor which, though itself watertight, must be in contact with the outside (for instance through holes on the sides of the rod) in order to work properly.

The electronic elements of the portable stationary units are: a circuit measuring the height by means of a barometric sensor, a receiver of the inquiries sent by the portable mobile unit, and a transmitter of the electromagnetic echo.

Inquiries are used to determine the distances and the differences in level both between the portable mobile unit and the portable stationary units, and between the portable stationary units themselves. Apart from measuring height and distance, the portable mobile unit works out the data received by the portable stationary units and supplies the required measures.

An electronic control keyboard is housed in a portable container connected to the portable mobile unit either through a cable or through electromagnetic waves.

The invention at issue is meant to be used as follows:

Plumb set the portable stationary units on the extremities of a base line chosen in advance.

Turn on both the portable stationary units (through switches) and the portable mobile unit (by portable control keyboard input).

Begin the measurements for the trilateration by plumb setting the portable mobile unit.

Put either at zero or at a known altitude one of the units through portable control keyboard. By being interrogated, the portable control keyboard displays the distances measured on the incline, the differences in level, the distances on the horizontal related to the space between the portable stationary units and to the space between each portable stationary unit and the portable mobile unit.

Data can be recorded into a suitable peripheral, possibly incorporated in the portable control keyboard.

In FIG. 1, for instance, A and B are the extremities of a chosen base line where the portable stationary units are to be set. C is a point to be surveyed according to the trilateration method, and the portable mobile unit is set on it. B' and C' are the projections of B and C on an horizontal plane set at the altitude of ±0.00 and passing through A (the datum point in this example).

Once all the units have been set up and as a result of the operator's request by portable control keyboard input, data similar to the following ones appear on the control unit display (all the measures are only an example concerning FIG. 1):

| AB | = | 538,456 m | CA | = | 774,786 m |
|---|---|---|---|---|---|
| AB' | = | 537,859 m | CB | = | 555,140 m |
| hA | = | 0,000 m | C'A | = | 773,410 m |
| hB | = | 25,347 m | C'B' | = | 554,750 m |
|  |  |  | hC | = | 46,143 m |

The data of the second column change during the measurements of the subsequent points (DA, DB, D'A, hD-EA, EB, B'A, B'B, hB etc.). On the contrary, the first column, which refers to the base line AB, does not change. It could therefore appear on the display only after a request from the operator, unless the two portable stationary units were accidentally moved by the wind, by animals etc. In such a case an error message would appear on the display, and it would be necessary to set up the portable stationary units again in order to continue the survey. In this way it is possible to measure as many triangles as are the points to be surveyed, all of which having in common the chosen base line AB.

All the measures resulting from such data (for instance: Cartesian coordinates of the points, area delimited by the surveyed targets, etc.) could obviously be displayed at the operator's request. To such a purpose the portable control keyboard should contain also a calculator with built-in coordinate-geometry functions. This would be useless when the portable control keyboard incorporates a data register which can compute such functions by employing its own microcomputer. It is possible to note further features and advantages of the device at issue when built in the above-mentioned shape which, even if more convenient is not binding, as shown in the enclosed drawings, that is to say:

FIG. 1: Schematic tridimentional representation of the three portable units while in use.

FIG. 2: Frontal view of the portable mobile unit as a whole. It is possible to note both the knurled parts that can be unscrewed to open the unit, and the cable to connect the portable control keyboard.

FIG. 3: View from above of the portable mobile unit. The spherical level is clearly visible here.

FIG. 4: Transverse section (indicated in FIG. 2) of the portable mobile unit, where the internal space is clearly visible.

FIG. 5: Longitudinal section (indicated in FIG. 3 and in FIG. 4) from which it is possible to see the internal space, the location of the different elements, the water-tight system (near the barometric sensor and near the accumulators), and the system to open the different sections.

FIG. 6: Portable control keyboard.

Figure 7:
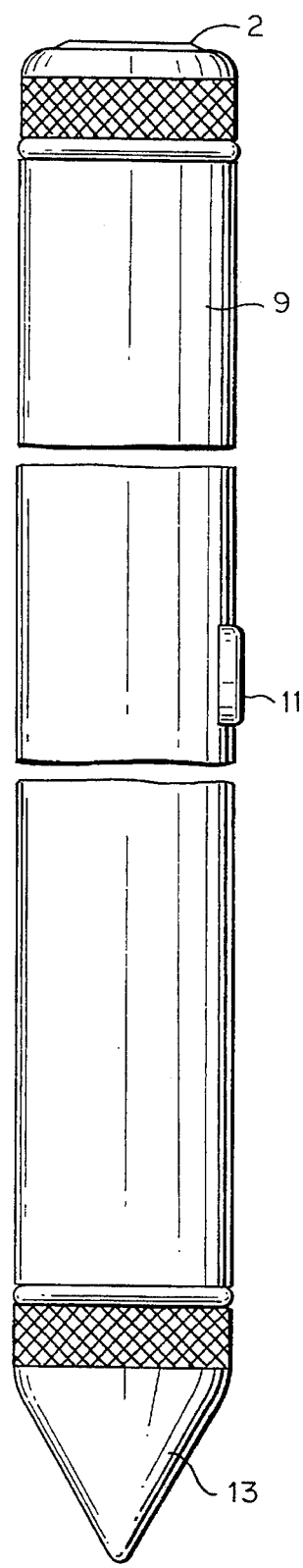

FIG. 7: Frontal view of the portable stationary unit as a whole. It is possible to note both the knurled parts that can be unscrewed to open the unit and the on/off switch.

Figure 8:
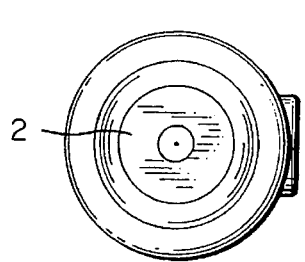

FIG. 8: View from above of the portable stationary unit. The spherical level is clearly visible.

Figure 9:
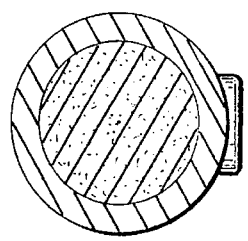

FIG. 9: Transverse section (indicated in FIG. 7) of the portable stationary unit.

Figure 10:
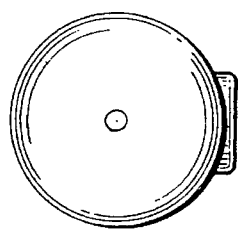

FIG. 10: View from below of the portable stationary unit.

Figure 11:
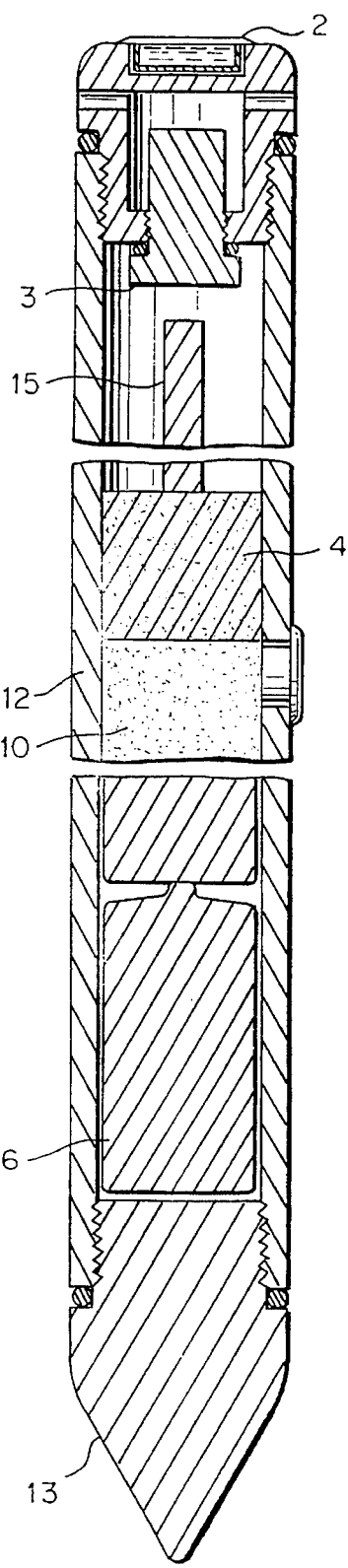

FIG. 11: Longitudinal section (indicated in FIG. 8 and in FIG. 9) from which it is possible to see the internal space, the location of the different elements, the water-tight system (near the barometric sensor and near the accumulators), and the system to open the internal sections.

Figure 12:
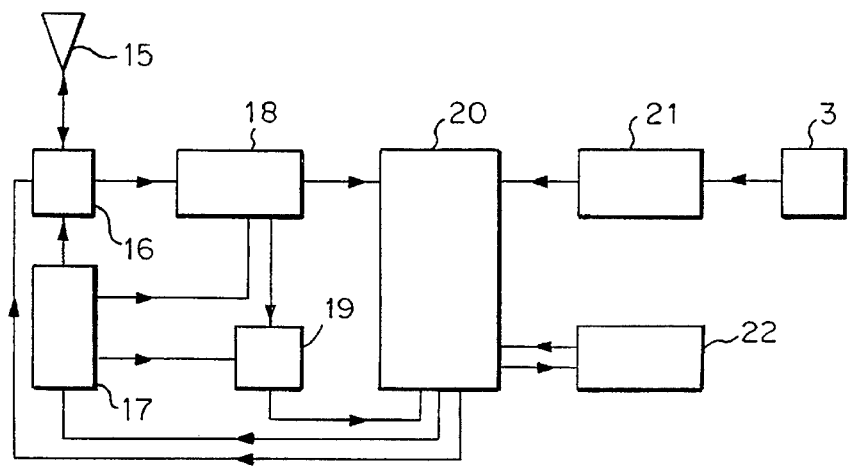

FIG. 12: Block diagram of the electromagnetic waves transceiver connected to the first portable stationary unit.

Figure 13:
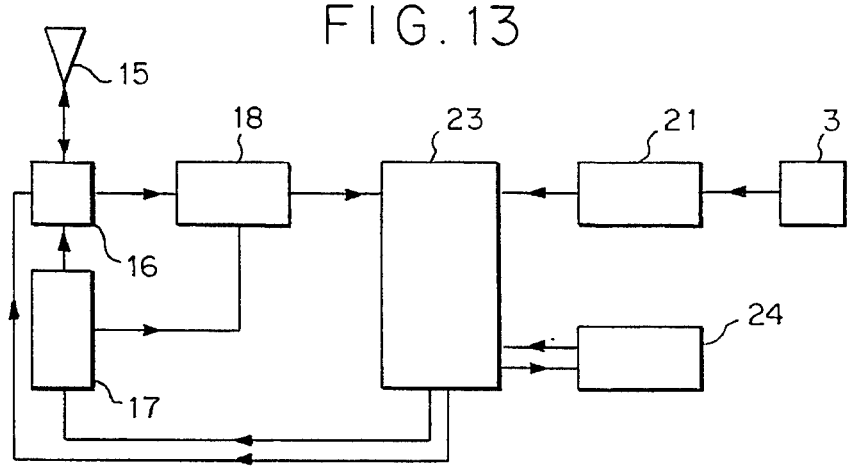

FIG. 13: Block diagram of the electromagnetic waves transceiver connected to the second portable stationary unit.

Figure 14:
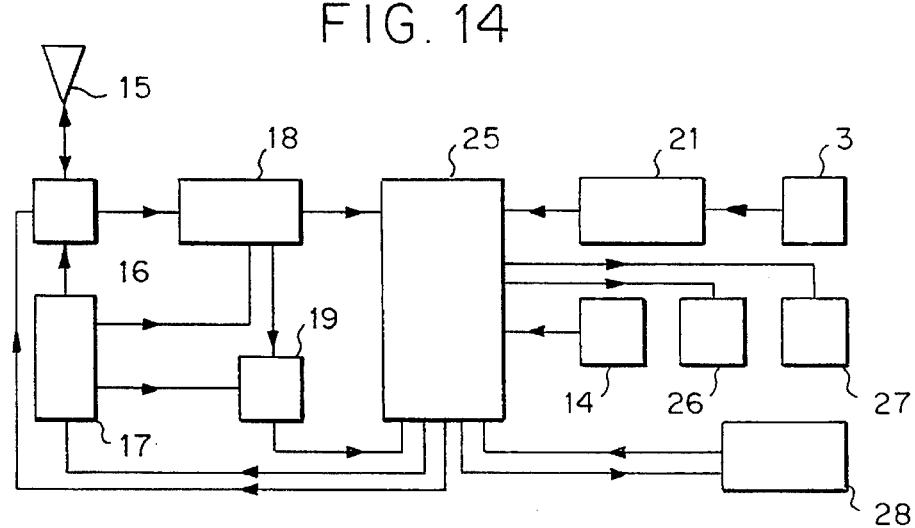

FIG. 14: Block diagram of the electromagnetic waves transceiver and of the electronic parts which process the data, both connected to the portable mobile unit.

The main feature of the device at issue is the use of the transmission of electromagnetic waves in the measurement of distances. In detail:

The portable mobile unit 1, built as a tube in watertight and insulating material, includes one spherical level 2, one barometric sensor 3, one electromagnetic waves transceiver 4, one electronic circuit to process the surveyed data 5, a series of accumulators 6, one multiple cable socket 7 and one portable control keyboard 8. The portable stationary unit 9 differs from the portable mobile unit 1 only for the lack of the portable control keyboard 8, for the different electronic circuits which process the surveyed data 10 and for the on/off switch 11.

Both the unit 9 and the unit 1 consist of a tube 12 of insulating material as supporting frame, which has a pointed lower end in order to allow an accurate positioning. The accumulators 6 providing the necessary energy to all the electric and electronic circuits are housed in the lower part of the tube 12. Both the electronic circuits 10 and the circuits of the transceiver 4 are housed in the central part of the tube 12, while the aerial 15 is directly above them. The barometric sensor 3 and the spherical level 2 above it are located in the upper part of the tube 12.

The electronic elements of the portable stationary unit 9 consist of a circuit which measures the height by means of a barometric sensor 3 and one receiver 4 of the inquiries sent by the portable mobile unit 1 to the portable stationary units 9. Such elements are necessary to compute the distances between the two above-mentioned units as well as between two different portable stationary units 9.

Apart from measuring the relative height, the portable mobile unit 1 processes the data received from the portable stationary units 9 and, subsequently, supplies the requested measures.

The portable control keyboard 8 is connected to the portable mobile unit 1 by means of a cable plugged in the socket 7.

The device at issue, in order to survey by means of electromagnetic waves and barometric sensors, has to be used in the following way:

Plumb setting of the portable stationary units 9 on the extremities of the chosen base line;

Turning on of both the portable stationary units 9 (by means of the switches 11) and of the portable mobile unit 1 (by portable control keyboard 8 input);

Plumb setting of the portable mobile unit 1 and beginning of the survey for the trilateration;

On request of the operator by keyboard 14 input, the portable control unit 8 displays the distances measured on the incline, the differences in level and the distances on the horizontal related to the space between the portable stationary units 9 and the portable mobile unit 1.

It is possible to connect the device to a peripheral, on which the surveyed data are continually recorded for a later processing.

To complete the description, it is for instance worth mentioning the electronic block diagrams of the instruments.

The transceiver of the first portable stationary unit, shown in FIG. 12, employs a modulated electromagnetic waves transmitter (17) both for the transmission of data and for telemetering distances through the electronic circuit (19). It also employs a receiver (18) synchronised with the transmitter in order to receive both the interrogations sent by the portable mobile unit and the data sent by the other portable stationary unit. An electronic aerial change-over switch (16) automatically switches over the aerial from the transmitter to the receiver and vice-versa.

The electronic system of the first portable stationary unit, shown in FIG. 12, consists of a microprocessor (20) with its interfaces which carries out the following tasks:

it receives the inquiries—sent by the portable mobile unit—through the receiver (18);

it measures the distance between the two portable stationary units by means of the transceiver system (17 and 18), using one of the radiotelemetering methods;

on request by the portable mobile unit, it transmits the data referring both to the first portable stationary unit's absolute height and to the distance between the two portable stationary units;

it records in and reads from its own memory (22);

it cyclically repeats the telemetering between the first and the second portable stationery unit.

A barometric sensor (3) is employed to measure the absolute height. The signal of the barometric sensor is amplified by an amplifier (21), while also the temperature compensation, as well as the conversion of the signal from analog to digital, take place in the sensor itself.

The transceiver of the second portable stationary unit, shown in FIG. 13, employs a modulated electromagnetic waves transmitter (17) for the transmission of data. It also uses a receiver (18) synchronised with the transmitter for the reception both of the inquiries sent from the portable mobile unit and of the data sent by the other portable stationary unit. The electronic aerial change-over switch (16) automatically switches over the aerial from the transmitter to the receiver and vice-versa. The electronic system of the second portable stationary unit, shown in FIG. 13, consists of a microprocessor (23) with its interfaces which carries out the following tasks:

it receives the inquiries—sent from the portable mobile unit—about its absolute height through the receiver (18);

it transmits the data of its absolute height to the portable mobile unit through the transmitter (17);

it reflects the telemetric signals after request of either the other portable stationary unit or the portable mobile unit;

it records in and reads from its own memory (24).

A barometric sensor (3) is employed in order to measure the absolute height. The signal of the barometric sensor is amplified by an amplifier (21), while also the temperature compensation, as well as the conversion of the signal from analog to digital, take place in the sensor itself.

The transceiver of the portable mobile unit, shown in FIG. 14, employs a modulated electromagnetic waves transmitter (17) both for the transmission of inquiries and for telemetering distances by means of the electronic circuit (19). It also employs receiver (18) synchronised with the transmitter for the reception both or the data referring to the chosen base line—sent by the first portable stationary unit (FIG. 12)—and of the data sent by the second portable stationary unit.

The electronic aerial change-over switch (16) automatically switches over the aerial from the transmitter to the receiver and vice-versa.

The electronic system o f the portable mobile unit, shown in FIG. 14, consists of a microprocessor (25) with its interfaces which carries out the following tasks:

it interrogates the first portable stationary unit, shown in FIG. 12, by means of the transmitter (17), in order to receive data about both the stationary unit's absolute height and the distance between the portable stationary units, which are recorded in the stationary unit's memory (22);

it interrogates the second portable stationary unit, shown in FIG. 13, by means of the transmitter (17) in order to receive data recorded in the stationary unit's memory (24) about the same unit's absolute height;

it receives the data recorded in the memories (22) and (24) by means of the receiver (18);

by employing one of the radiotelemetering methods through the transceiver (17 and 18), it measures the distance between itself and the two portable stationary units;

it codifies the instruction sent by keyboard (14) input and controls the alphanumeric display (26);

it sends the data to be recorded to the possible peripheral (27);

it records in and reads from its own memory (28);

it processes the data about all three units' absolute heights and calculates the relative heights by referring them to a datum in order to obtain the measures of the differences in level between the units. Such data will be used to calculate the projection on the horizontal plane of the distances surveyed on the incline;

it cyclically repeats the inquiries to the two portable stationary units in order to verify the uniformity of the position data and to signal any possible change.

A barometric sensor (3) is employed in order to measure the absolute height. The signal of the barometric sensor is amplified by the amplifier (21), while also the temperature compensation as well as the conversion of the signal from analog to digital take place in the sensor itself.

We claim:

1. A surveying system using radio waves and barometric sensors for surveying by means of the trilateration method the system comprising: at least two portable stationary units (9) and one portable mobile unit (1) characterized both by employing radio ranging electromagnetic waves as vectors and by that the above-mentioned units are built as rods made of a tube (12) of watertight and insulating material with a lower pointed end (13) and a spheric level (2) on the upper end; accumulators (6), transceiver instruments (4), an aerial (15) and a barometric sensor (3) are housed inside the tube (12); the tube (12) of the portable mobile units (1) contains also electronic components (5) for processing of surveyed data, while a portable control keyboard (8) is connected to the tube (12) of the portable mobile units through a cable plugged in a multiple cable socket (7); each of the portable stationary units (9) houses inside the tube (12) the electronic components (10) which:

include at least one microprocessor (20) or (23) with its interfaces; such microprocessor is connected to a signal amplifier (21) and, through the signal amplifier, to the barometric sensor (3), it is moreover connected to a memory (22) or (24); the electronic components (10) are also connected to the transceiver instruments (4) which comprise a modulated electromagnetic waves transmitter (17) and of a receiver (18) both connected to the aerial (15) through an electronic aerial change-over switch (16); the portable mobile unit (1) houses inside the tube (12) the electronic components (5), which:

include at least one microprocessor (25) with its interfaces which is connected to a signal amplifier (21) and, through it, to the barometric sensor (3); such microprocessor is moreover connected to both a memory (28) and to an electronic circuit (19) for the telemetering of distances; the above-mentioned electronic components (5) are connected also to the transceiver instruments (4) both the latter elements are connected to the aerial (15) through an electronic aerial change-over switch (16); the electronic components (5) are also connected both to an electronic portable control unit (8) which includes a keyboard (14) and an alphanumeric display (26) and to a possible peripheral (27) for the registration of data.

2. SURVEYING SYSTEM USING RADIO WAVES AND BAROMETRIC SENSORS, according to claim 1; in which the electronic components (10) of at least one portable stationary unit (9) are characterized both by an electronic circuit (19) for the telemetering of distances, and by the fact that the same circuit (19) is connected also to the transceiver instruments (4).

3. SURVEYING SYSTEM USING RADIO WAVES AND BAROMETRIC SENSORS according to claim 1; characterized by the fact that outside the tube (12) of each portable stationary unit (9) there is an on/off switch (11).

* * * * *